(12) United States Patent
Gölling

(10) Patent No.: US 8,690,107 B2
(45) Date of Patent: Apr. 8, 2014

(54) HIGH-LIFT SYSTEM FOR AN AIRCRAFT

(75) Inventor: Burkhard Gölling, Buchholz i.d.N (DE)

(73) Assignee: Airbus Operations GmbH, Hamburg (DE)

(*) Notice: Subject to any disclaimer, the term of this patent is extended or adjusted under 35 U.S.C. 154(b) by 41 days.

(21) Appl. No.: 13/530,156

(22) Filed: Jun. 22, 2012

(65) Prior Publication Data

US 2013/0009015 A1    Jan. 10, 2013

Related U.S. Application Data

(63) Continuation of application No. PCT/EP2010/007921, filed on Dec. 23, 2010.

(60) Provisional application No. 61/289,438, filed on Dec. 23, 2009.

(30) Foreign Application Priority Data

Dec. 23, 2009 (DE) .......................... 10 2009 060 326

(51) Int. Cl.
    *B64C 21/08* (2006.01)
(52) U.S. Cl.
    USPC ........................................... 244/208; 244/130
(58) Field of Classification Search
    USPC ......... 244/203, 201, 207, 208, 209, 211, 212, 244/215, 216, 130
    See application file for complete search history.

(56) References Cited

U.S. PATENT DOCUMENTS

| | | | | |
|---|---|---|---|---|
| 3,009,668 A | * | 11/1961 | Nystrom | ....................... 244/207 |
| 3,447,763 A | | 6/1969 | Allcock | |
| 3,576,301 A | * | 4/1971 | Stickle | .......................... 244/216 |
| 4,720,066 A | * | 1/1988 | Renken et al. | ................. 244/213 |
| 6,253,126 B1 | * | 6/2001 | Palmer | ............................. 701/14 |
| 7,243,881 B2 | * | 7/2007 | Sakurai et al. | ................. 244/212 |
| 7,255,309 B2 | * | 8/2007 | Boldrin et al. | ................. 244/208 |

FOREIGN PATENT DOCUMENTS

| | | |
|---|---|---|
| DE | 102009011662 | 9/2010 |
| EP | 0 068 737 | 6/1982 |
| WO | WO 2010/084025 | 7/2010 |

OTHER PUBLICATIONS

International Search Report for Application Serial No. WO 2011/076425 A3 dated Aug. 12, 2011.

* cited by examiner

*Primary Examiner* — Timothy D Collins
*Assistant Examiner* — Brian M O'Hara
(74) *Attorney, Agent, or Firm* — Jenkins, Wilson, Taylor & Hunt, P.A.

(57) ABSTRACT

A high-lift system with a main wing and adjustable flaps as well as guiding devices for holding the adjustable flaps and adjustment devices for adjusting the adjustable flaps, wherein the respective guiding device and/or adjustment device at least in part include/includes a fairing, including a flow influencing device for influencing the flow around the high-lift system, with at least one inlet line with at least one inlet that is situated on or below the bottom of the high-lift system, wherein, furthermore, at least one outlet line for air is provided that includes a fluid-communicating connection to the inlet line and includes at least one outlet situated at the top in the region of at least one adjustable flap of the high-lift system.

16 Claims, 6 Drawing Sheets

HIGH-LIFT SYSTEM FOR AN AIRCRAFT

CROSS-REFERENCE TO RELATED APPLICATIONS

The present application is a continuation of International Application No. PCT/EP2010/007921, filed on Dec. 23, 2010, which claims priority from German Application DE 10 2009 060 326.3, filed on Dec. 23, 2009, and claims the benefit of U.S. Provisional application 61/289,438, filed on Dec. 23, 2009, each of which is hereby incorporated in its entirety by reference.

FIELD OF THE INVENTION

The invention relates to a high-lift system with a main wing and adjustable flaps as well as guiding devices for holding the adjustable flaps and adjustment devices for adjusting the adjustable flaps as well as a flow influencing device for influencing the flow around the main wing and adjustable flaps.

BACKGROUND

Such high-lift systems are often designed such that in the extended position of the flap a gap between a regulating flap of the high lift system and the main wing is formed. In particular flight situations, with the flap in such an extended position, a defined quantity of air can move through this gap from the pressure side or bottom of the main wing to the suction side or the top of the adjustable flap. With this wing configuration in particular flight situations, for example during slow flight during the takeoff or landing procedure, separation of the flow on the adjustable flap can be prevented or reduced in such flight situations. For example, the gap arises as a result of a trailing-edge flap as a so-called landing flap being extended. In its retracted state there is thus no gap, and consequently it is thus not possible to supply an airflow from the bottom of the high-lift system to the flow above the high-lift system.

SUMMARY

Embodiments of the invention provide a high lift system with improved aerodynamic efficiency.

With the solution according to various embodiments of the invention, a high-lift system can be provided by that, with an extended state of the flap with adjusting a gap between the main wing and the flap, the supply of air flowing from the suction side of the main wing to the suction side the air flow can be adjusted precisely and in an uncontrolled manner. Said air flow can be adjusted in a predetermined manner in a current flight situation and, for example, in dependence of wind gusts. According to an embodiment of the invention, the gap geometry can be adjusted to the current flight situations.

A high-lift system according to various embodiments of the invention includes a main wing and adjustable flaps as well as guiding devices for holding and guiding the adjustable flaps and adjustment devices for adjusting the adjustable flaps, wherein the respective guiding device and/or adjustment device at least in part include/includes a fairing. In particular, the fairing covers partly or completely the guiding device and/or adjustment device. Furthermore, a flow influencing device for influencing the flow around the high-lift system is provided, which flow influencing device includes at least one inlet line with at least one inlet that is situated on or below the pressure side of the main wing or, generally, the bottom of the high-lift system. Furthermore the flow influencing device includes at least one outlet line for air that includes a fluid-communicating connection to the inlet line and includes at least one outlet. This outlet is situated at the top of the high-lift system in the region of at least one adjustable flap of the high-lift system. In particular, the outlet is situated in a region on the surface of the main wing which is located on the suction side of the main wing. In an embodiment of the invention, the outlet is located in the area of the last 60% of the complete chord length of the main wing and in particular of the last 30% thereof. Further, several outlets or a plurality of outlets can be provided, in particular in one of the regions as defined before. In this embodiment, the several outlets or a plurality of outlet are distributed over the spanwise direction and/or the chordwise direction. In this context the term "region" refers both to the area of the respective adjustable flap itself at the top of the high-lift system, and to a region around this area of the adjustable flap. In this arrangement the region can account for up to 60% of the shape of the corresponding adjustable flap in the chordwise direction of the flap on the adjacent part of the high-lift system, in particular on the main wing. The region can in particular account for up to 60% of the suction side surface of the main wing along the respective flap when seen in the spanwise direction. This makes it possible to influence the flow not only on the respective adjustable flap, but also already in the region that when viewed in the direction of flight is situated upstream of this adjustable flap. In this way even with a delayed effect of flow influencing, with a view to the flight direction, said flow influencing can be effected on the adjustable flap, in other words in the region of flow separation. Furthermore, in relation to the inlet an inlet opening and closing device is provided, and this inlet opening and closing device is forcibly coupled to the adjustment device for the purpose of adjusting at least one adjustable flap by means of a coupling.

In particular, a high-lift system with a main wing and adjustable flaps as well as guiding devices for guiding the adjustable flaps and adjustment devices for adjusting the adjustable flaps is provided. The respective guiding device and/or the adjustment device at least in part include/includes a fairing, the high-lift system. The high-lift system includes a flow influencing device for influencing the flow around the high-lift system. Further, the flow influencing device includes:

at least one inlet line with at least one inlet that is situated on the pressure side of the high-lift system, at least one outlet line for air, which is connected to the inlet line by a fluid-communicating connection and which includes at least one outlet situated at the suction side of the high-lift system in the region of at least one adjustable flap, and in relation to the inlet an inlet opening and closing device which is coupled to the adjustment device in such a manner that by adjusting at least one adjustable flap by means of a coupling the inlet opening and closing device is opened or closed.

In this arrangement the inlet opening and closing device can include various embodiments. For example the provision of a screen or a flap is possible. Also imaginable is a design as a rosette closure. Such a screen or a flap can be moveably or rotatably coupled to the main wing. Apart from purely mechanical embodiments, materials that are deformable, in particular relating to deformation in the elastic region, are imaginable in order to form the inlet opening and closing device. The coupling or the coupling device, too, can be designed in various ways. For example a purely mechanical coupling is possible, as is a coupling using electronic and/or electromechanical components. The coupling is preferably designed so as to be decentralised, in other words it is integrated in the system of the flow influencing device. In particular, a fluid actuator which uses pressurized air to blow out air through the at least one outlet in a pulsed or continuous manner can be used. In this manner a compact system with little complexity is created. Apart from avoiding complexity, in this manner it is also possible to make do without additional cabling as a result of the connection to further control circuits or even without mechanical kinematics or actuators. Furthermore, such a system is very robust, in other words it provides low susceptibility to faults.

By means of a coupling according to various embodiments of the invention it is thus possible for the flow influencing device to carry out precisely the mode of action that is suitable for the respective configuration of the adjustable flap. Thus, during extension of the adjustable flap to the position for takeoff of the aircraft it is, for example, possible, in parallel and continuously, to also open the inlet opening and closing device so as, for the situation with the adjustable flap being configured ready for takeoff, at the same time to also obtain the correct mode of action of the flow influencing device. The coupling thus replicates the logical connection between the flow influencing device and the adjustable flap. This replication can be implemented either with mechanically acting actuators or by means of electrical and/or electronic effects. Thus a combination including sensors, signal lines and electric motors can, for example, produce this logical connection.

In this context the term "top of the high-lift system" relates to the region of the high-lift system which with intended use, in other words for example during cruising, is in contact with the suction region or the negative pressure region. Consequently, the term "bottom of the high-lift system" thus refers to the aforesaid with intended use being in contact with the pressure region.

In a high-lift system according to various embodiments of the invention it can be advantageous for the forcible coupling to include a mechanical coupling between the inlet opening and closing device and the adjustment device. The forcible mechanical coupling can, for example, be established with the use of lever kinematics. The use of linkage rods or cable pull arrangements is also possible. In particular for translational movement along a straight line, coupling by means of a telescopic mechanism can also take place. Mechanical coupling can also take place in that the inlet of the flow influencing device moves away from an inlet opening and closing device that covers the inlet. For example, the inlet opening and closing device can be a fixed, in other words immovable, component of the fairing, while the inlet, together with the inlet line, can move away from the inlet opening and closing device, and consequently the inlet opens. In the context of the present invention this embodiment, too, is covered by the term "kinematic coupling".

Furthermore, it can be advantageous if in a high-lift system according to various embodiments of the invention, the forcible coupling includes an electronically controlled coupling between the inlet opening and closing device and the adjustment device. In this context it should be pointed out that a combination of various coupling systems is also possible, For example, mechanical components of the forcible coupling can also be controllable with the use of electronic means, for example small electric motors.

An electronic coupling can, for example, be generated by means of variable resistors for determining the position of the adjustable flap or generally by way of a sensor arrangement or a position sensor. As an alternative, the coupling can also be controlled by means of information from the flight control system. In this arrangement the actuating signal of the flight control system is transmitted to the adjustable flap by way of a signal line to the coupling in order to, parallel to the adjustable flap, also regulate the inlet opening and closing device. A third option consists of using the existing sensor arrangement of the adjustable flap, which sensor arrangement communicates with the flight control system, as a control device for the inlet opening and closing device.

Furthermore, it can be advantageous if in a high-lift system according to various embodiments of the invention, the inlet opening and closing device can assume quantitatively different opened positions, which opened positions cause different flow throughputs through the flow influencing device. In this arrangement the active opening cross section of the inlet can be set by means of quantitatively adjusting the inlet opening and closing device. In other words, between the positions "open" and "closed", the inlet opening and closing device can assume defined individual positions or also any number of intermediate positions. A continuous opening action is also possible. In this arrangement, in the case of high flow speeds, a mechanical click-stop arrangement can be sensible in order to support the air load on the inlet opening and closing device, in other words the cover, so as to prevent any unwanted further opening or closing of the inlet opening and closing device. Apart from the fairing, the front edge of the main wing or the bottom of the high-lift system can also be inlet locations.

In a high-lift system according to various embodiments of the invention, advantageously, further sensors can be provided that detect the state of the inlet opening and closing device. In this arrangement these sensors can be directly coupled to the inlet opening and closing device, and can, for example, monitor the opening angle of a closing flap. In this manner a kind of internal control loop is formed which, for example, uses the mass flow, the volume flow or the pressure of the volume flow that has been let into the inlet line, as well as the speed of the volume flow that has been let in, or the temperature, for the purpose of regulating the inlet opening and closing device.

It is also possible to provide a control loop that obtains its desired values from the position of the adjustable flap, and in relation to the airflow on the adjustable flap, which airflow is necessary for the respective position, readjusts the inlet opening and closing device. In this manner not only the flow influencing device, but also regulation of it, can be carried out in a decentralised manner and even passively.

It is also possible to have sensors located at the top of the high-lift system to act as an external control loop. In this manner it is possible for the sensor to directly describe the achieved flow state and to use it also as an input signal for regulating the inlet opening and closing device.

Moreover, in a high-lift system according to various embodiments of the invention it can be advantageous to arrange the flow influencing device at least in part within the fairing. In this arrangement the at least one outlet of the flow influencing device faces the chord direction of the main wing of the high-lift system. In this way two essential advantages can be achieved. On the one hand by arranging the flow influencing device within the fairing any undesired influencing of the flow at the bottom of the high-lift system can be reduced or prevented entirely. The aerodynamically optimised external contour of the fairing thus apart from the aerodynamics associated with creating a flow around the bottom of the high-lift system is also used to receive at least part of the flow influencing device. In order to achieve the air volume flow necessary for influencing the flow, by way of the inlet of the flow influencing device, air is fed from outside the high-lift system into this flow influencing device.

Such a system provides a second large advantage with its passive design. This is achieved by facing the inlet of the high-lift system in the chord direction of the main wing. In this context the term "inlet facing the chord direction of the main wing" means that the inlet opening opens at least part of its cross section in a direction which is oriented opposed to the direction of the chord direction of the main wing. This therefore precludes any designs that include opening cross sections of the inlet that are aligned parallel to the chord direction of the main wing. In this manner the air that flows on the bottom of the high-lift system according to various embodiments of the invention can enter without hindrance into at least the facing part of the cross section of the inlet, and can reach the inlet line of the flow influencing device. Subjecting the flow influencing device to compressed air thus takes place automatically, or quasi-passively, as a result of the movement of the entire high-lift system, for example with an aircraft. In this arrangement influencing the flow at the bottom of the high-lift system is reduced to a minimum because only the necessary quantity of air is removed from this bottom flow by the minimum opening of the inlet, while the remaining flow moves in an aerodynamically optimised manner along the fairing below the high-lift system. The embodiment according to the invention thus provides a passive system that is simple to construct while at the same time being associated with few aerodynamic disadvantages relating to the bottom flow of the high-lift system.

It can be advantageous if in a high-lift system according to various embodiments of the invention, at least one inlet is designed as an opening in the fairing. The further blending-in of the inlet line, the inlet and the fairing is better still from the point of view of aerodynamics. Incorporating the inlet directly in the fairing thus makes possible a seamless transition between the flow influencing device within the fairing and this fairing itself This means that no element of the flow influencing device projects from the fairing, but instead the inlet line closes off so as to be flush with its inlet at the fairing itself In this arrangement the inlet can include a host of different geometric shapes. Apart from simple round or elliptic cross sections, which can be sensible in the case of various angles of inclination relative to the chord direction of the main wing, in order to achieve the effective flow cross section that is necessary for the quantity of air for influencing the flow, complex geometries or even blends can be advantageous, which arise quasi-automatically as a result of a flush finish with the fairing of the high-lift system. In this arrangement, if more than one inlet is provided for the flow influencing device, advantageously a symmetrical arrangement of the inlets and thus advantageously an even number of inlets of the flow influencing device, for example two, four or six, are provided.

In a high-lift system according to various embodiments of the invention, the inlet opening and closing device can be designed in a host of different ways. Thus it is, for example, possible for this inlet opening and closing device to operate purely mechanically or piezoelectrically. Furthermore, elastic materials or electrically-controlled elastic materials can be used to implement the inlet opening and closing device. Moreover, the use of so-called smart elastic materials, which for example from a particular counterpressure onwards open up in the manner of an overpressure valve, can be sensible. In the context of proper functionality of various embodiments of the present invention, it should be noted that both active control of the inlet opening and closing device, and a passive, quasi-automatic, design of these inlet opening and closing devices can be sensible. In particular with the least possible expenditure and with the necessity of reducing weight a passive design of the inlet opening and closing device can be very advantageous. If there is a necessity for active influencing in a host of different flight situations, it may, however, also be advantageous if the inlet opening and closing device can be operated actively, for example in the form of mechanically controllable flaps. Both for active and for passive systems, and also for hybrids of both variants, furthermore, sensors are advantageous that control and monitor the then current flow situation of the high-lift system, in particular in the regions that are to be influenced by the flow influencing device. On the one hand these sensors can be processed directly by way of the central control logic of the high-lift system or of an aircraft equipped with it, but on the other hand they can also be used in a decentralised manner, in other words in the high-lift system itself for the purpose of controlling the inlet opening and closing devices.

Furthermore, in a high-lift system according to various embodiments of the invention, it is also possible to provide an outlet opening and closing device for at least one outlet. As already explained in detail in the context of the inlet opening and closing device, the outlet opening and closing device, too, can be constructed in an identical manner. Automatic opening from a defined interior pressure onward provides an additional option for the outlet device. In this way it is quasi-possible to use an overpressure valve that in a passive manner controls the outlet of air from the outlet of the flow influencing device by way of the outlet opening and closing device.

In a high-lift system according to various embodiments of the invention, the forcible coupling can be designed in such a manner that the status of the respective opening and closing device is determined by the actuating position of the adjustable flap. This correlation can take place either actively or passively. In the case of active correlation, sensors of an electrical or mechanical type can be present which detect the then current position of the adjustable flap. Detection of the position of the adjustable flap by the actuator of the adjustment device itself is also imaginable. Depending on the position of the adjustable flap, the inlet opening and closing device and/or the outlet opening and closing device are/is actively opened or closed, and consequently, for example during slow flight in the takeoff or landing phase with the adjustable flap extended, both the inlet opening and closing device and the outlet opening and closing device open, and the flow is influenced. Passive control is also imaginable. For example, a kinematic coupling, for example by means of a gear arrangement between the adjustment device, for adjusting the adjustable flaps and the inlet opening and closing device and/or the outlet opening and closing device can be provided. Such a gear arrangement, which is directly driven as the adjustable flap is adjusted, can for example open or close the inlet opening and closing device and/or the outlet opening and closing device by way of a further mechanical follow-on arrangement.

In this arrangement it can be advantageous if in a high-lift system according to various embodiments of the invention, the degree of opening the respective closing device depends on the actuating position of the adjustable flap of the high-lift system. This means that the respective opening and closing device can open and close even quantitatively. Consequently, different airflows can be set by the flow influencing device by way of the degree of opening of the inlet opening and closing device and the outlet opening and closing device. Depending on the degree of necessity for influencing the flow, which degree in turn can depend on the degree of adjustment of the adjustable flaps, it is thus possible, by way of the degree of opening the inlet opening and closing device and the outlet opening and closing device, to set the degree of influencing.

However, basic opening, i.e. non-quantitative opening, of the closing devices can depend on the actuating position of the adjustable flap. Thus, in flight situations in which the adjustable flap is in a resting position, for example during cruising, the inlets can be closed in order to achieve fuel-saving aerodynamics at the fairing, while opening the closing devices takes place only in flight situations with an activated, for example extended, adjustable flap.

In a high-lift system according to various embodiments of the invention, furthermore, at least one inlet line and/or at least one outlet line with a control valve or a pump for influencing the volume flow can be provided within the flow influencing device. In particular with the use of the flow influencing device in particular flight situations, a pump or a control valve can still further optimise the flow influencing device. For example, a pump can be used to draw in additional air in particularly slow flight situations, for example during landing, if the quantity of air necessary for influencing the flow cannot adequately be ensured by way of the inlet of the flow influencing device during this slow flight situation. Thus even in slow flight situations it becomes possible to achieve high pressure and thus a high volume throughput through the flow influencing device. However, such a pump is only used to support flow influencing; it can therefore be designed so as to be relatively compact and of low performance. The main load of the flow influencing device, in other words the largest quantity of air, continues to be generated passively by means of the flow speed at the bottom of the high-lift system. In contrast, or parallel, to the use of a pump, it is also possible to use a control valve which in flight situations that with full opening of the inlet opening and closing device and outlet opening and closing device would result in excessive airflow which would influence the flow excessively. Such a control valve can then reduce a diameter region of the flow influencing device so that the maximum air volume flow is also reduced. With the use of a pump and/or a control valve it is, for example, possible to do without providing closing devices for the inlet line and outlet line, provided these two elements can be incorporated in a complete closing device.

A high-lift system according to various embodiments of the invention can, furthermore, include a flow variator for the targeted variation of the airflow of the flow influencing device. Such a flow variator aims, in particular, to vary the flow over time. In a defined flight situation it is, for example, possible by means of the flow variator to generate a frequency of different air volume flows. In particular, in this manner pulsed blowing-out of the quantity of air present in the flow influencing device is possible. In this arrangement, pulsed blowing-out at the top of the high-lift system has a particularly positive effect on the flow in that location, in particular relating to a reduction or prevention of flow separation in these regions, or even re-attachment of the flow in this region. In this arrangement the flow variator can be provided at different positions within the flow influencing device. Thus, providing the aforesaid directly at the inlet or at the outlet is possible, as is the arrangement of the flow variator within the inlet line or the outlet line. Moreover, the use of a flow variator for a multitude of inlet lines and outlet lines as a shared flow variator is imaginable.

Furthermore, the outlet line can include a Y-switch, wherein in one switch arm the flow variator is located, while in the second switch arm free flow can occur. In such a design it is thus possible, by way of the free switch arm, for a defined basic quantity of air to be set, while by way of the second switch arm and flow variator a variable quantity of air is overlaid on this basic quantity of air. In other words, in such a case the quantity of air at the outlet of the flow influencing device does not fluctuate between zero and a defined value, but instead between a minimum (free switch arm) and a maximum value (pulsed switch arm).

A flow variator according to various embodiments of the invention can, for example, be designed as a passively operating valve or as an actively operating pump. A passively operating valve can quasi be designed as a mechanical oscillating circuit that makes possible defined opening and closing of the valve that is matched to a frequency. In the case of different air speeds it is thus possible to achieve different closing frequencies of the flow variator and thus different pulse frequencies of the flow influencing device. Moreover, an active embodiment as a pump that operates with a frequency-controlled rotary speed, in particular with different rotary speeds, can be used in the present case. In this arrangement, in a high-lift system according to various embodiments of the invention, the flow variator can be arranged in the region of the at least one outlet or of the outlet line. The proximity of the flow variator to the outlet provides an advantage in that the speed at which changes in the pulse frequency of the flow variator reach the actual flow at the top of the high-lift system, and thus influence the aforesaid, is very high and consequently a very short response time arises. For this reason the flow at the top of the high-lift system can be influenced and above all optimised effectively, very quickly and very accurately by means of the flow influencing device.

In a high-lift system according to various embodiments of the invention, furthermore, a control device can be provided for receiving flight state data and using the same for generating control signals to actuate at least one opening and closing device of the at least one inlet and/or at least one opening and closing device of the at least one outlet, by means of which control device the flow of air over the suction side mainwing surface and/oder over the flap and/or the airflow through the gap in respective flap configuration states can be controlled or regulated with regard to certain flight situations. In this context, the term "controlling" or "regulating" the flow influencing device refers to the fluidic effectiveness of the flow influencing device and means that, on the basis of acquired sensor data, the control device calculates and generates control signals and sends the same to the respective actuator for actuating the at least one opening and closing device of the at least one inlet and/or at least one opening and closing device of the at least one outlet. For calculating the commands to the respective actuator, the control device includes a specific control function. This function can be designed such that with the generation of the command signal for the actuator or the actuators parameters defined by the current flight phase, like take-off, climb, approach or landing are used in the function in order to optimize the actuator command and the flow situation over the wing surface with regard to the flight phase.

For this purpose, flight state sensors and in particular a flight state sensor device which acquire or acquires the flight state of the aircraft can be used and can be functionally connected to the control device for transmitting acquired flight state data to the control device. The flight state date can in particular be the aircraft velocity and/or the dynamic pressure and/or the altitude of the aircraft. Alternatively or in addition thereto, air flow sensors and in particular an air flow sensor device which acquire or acquires the current property of the air or the aerodynamic state of the air flowing along the surface of the main wing and/or of the flap. In particular, the state of the air flowing along the suction side of the main wing and/or of the flap is acquired. In this regard, velocity sensors measuring the velocity of the air flow and/or pressure sensors measuring the air pressure of the air flow can be used. The air flow sensor device can in particular be located on the suction side of the main wing and/or of the flap. In particular, the flow sensor device can be located in the area of the last 60% of the complete chord length of the main wing and in particular of the last 30% thereof.

In this process, for example, activation can take place by opening an inlet opening and closing device and/or an outlet opening and closing device of the flow influencing device. The flight state data relates, in particular, to the flight speed, and also to state data of the high-lift system itself. Such flight state data of the high-lift system can, for example, be collected by load sensors or flow sensors on the high-lift system, in particular on the adjustable flaps themselves or in the region around the adjustable flaps.

In order to achieve as efficient a design as possible it may be advantageous if in a high-lift system according to various embodiments of the invention, a distributor line is provided between the at least one inlet line and the at least one outlet line. Such a distributor line is, in particular, sensible if with only a few inlet lines a multitude of outlet lines are to be served. In this manner a relatively large inlet line with correspondingly large inlets can be concentrated in the fairings that are present underneath the high-lift system, while by way of the distributor line a multitude of outlet lines and thus a multitude of outlets at the top of the high-lift system can be served. In particular, in this arrangement a multitude of outlets are distributed over the entire area of the high-lift system, which area is to be influenced. In this arrangement, distribution can take place both in the chord direction and in the wingspan direction of the main wing or of the respective adjustable flap. In addition, the distributor line can be provided as a location for accommodating central flow variators and/or pumps and/or control valves. In this manner, by means of a central element for influencing the flow within the flow influencing device, it is possible to further save costs and weight.

In situations in which the air volume flow within the flow influencing device exceeds the requirement for influencing the flow, it may be sensible in a high-lift system according to various embodiments of the invention for the at least one inlet line to be brought into fluid-communicating contact with further systems of the aircraft. For example, fluid-communicating contact with the air conditioning system and the hydraulic or pneumatic system is advantageous. In this manner it is possible to make do without pumps or additional inlets that are otherwise necessary for these systems, or such pumps can be designed so as to be more compact and less powerful, and thus more economical and lighter in weight.

With a fluid-communicating connection with the air conditioning system, in particular in the case of fast variations in flight altitudes, efficient adaptation of the cabin pressure is possible. As a result of the passive provision of large volume flows of compressed air, and the fluid-communicating connection of the flow influencing device to the pressurised cabin control system, a large quantity of air for increasing the pressure in the pressurised cabin can be made available relatively quickly and without additional compressors or power consumption at the engine. This equally also applies in reverse, namely to the relatively fast removal by suction, or the relatively fast letting-off of pressure from the pressurised cabin by way of the multitude of outlets of the outlet lines of the pressure influencing device. The fluid-communicating connection thus functions in both directions, namely to increase the pressure from the inlets to the cabin, and to reduce the pressure from the cabin to the outlets.

In particular with the use of a high-lift system according to various embodiments of the invention with a flow influencing device that is to influence the adjustable flaps it can be advantageous if the axial characteristics of the lines, in particular of the inlet line, the outlet line or the distributor line, are at least in part variable. For example, in this arrangement, during movement of the adjustable flaps, in particular of the trailing-edge flap, away from the main wing, the fluid-communicating connection within the inlet line can be maintained despite of axial displacement. The design as a telescopic line that includes telescoping elements is one possible embodiment of axial variability. Similarly, a design as a corrugated hose for bridging axial variations in length is imaginable in the context of the present invention.

An aircraft including at least one high-lift system according to an embodiment of the invention is also the subject of the present invention. Based on the use of a high-lift system according to an embodiment of the invention, such an aircraft can not only be constructed at a reduced weight, but it can also include improved aerodynamics even in difficult flight situations such as takeoff and landing. Apart from fuel savings, such improved aerodynamics can also result in further optimisation such as slower stable flight speeds and thus shortened takeoff and landing phases. This optimisation is above all aimed at reducing noise emissions.

BRIEF DESCRIPTION OF THE DRAWINGS

The present invention is described in more detail with reference to the example embodiments and the following figures. The following are shown.

DESCRIPTION

In order to, for the following description of the embodiments, explain the respective directions depending on the high-lift system, the individual directions are defined as follows:

In relation to the adjustable flaps 110 the following are defined: a flap chord direction K-KT or generally a chord direction, a wingspan direction K-SW or generally a wingspan direction, and a flap thickness direction K-KD or generally a thickness direction. Correspondingly, in relation to the main wing the following are defined: a main-wing chord direction H-KT or generally a chord direction, a main-wing wingspan direction H-SW or generally a wingspan direction, and a main-wing thickness direction H-KD or generally a thickness direction. The respective directions are shown in FIGS. 1, 2, 3 and 4.

Figure 1:
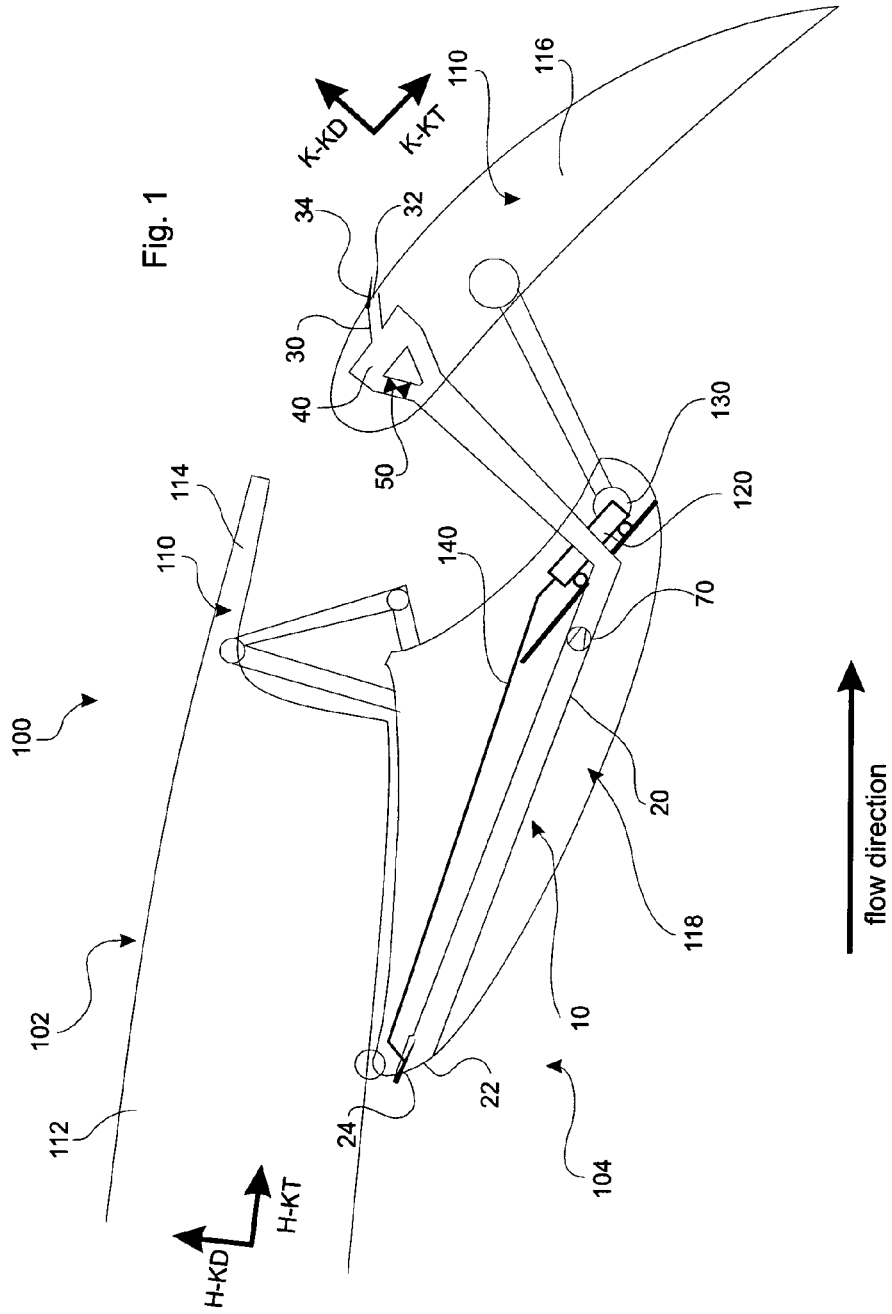
FIG. 1 a first example embodiment of the present invention.

FIG. 1 shows a first example embodiment of a high-lift system 100. In this arrangement the high-lift system 100 includes a main wing 112, a spoiler 114 as well as a trailing-edge flap 116. The trailing-edge flap 116 and the spoiler 114 are both adjustable flaps 110. In FIG. 1 the trailing-edge flap 116 is shown in its extended state. This extended state is, for example, set during the takeoff or landing phase in order to increase the lift surface of the high-lift system as well as the profile curvature of the high-lift system 100.

The trailing-edge flap 116 is held by a guiding device 130 which in turn includes a fairing 118. This fairing is among other things used to achieve a defined flow around the bottom 104 of the high-lift system 100. The fairing is a cover which at least partly covers the guiding device and/or the adjusting device. In particular, the fairing covers these parts or components of these devices which protrude from the main wing and optionally of the flap, when seen from the front side and in direction of the main-wing chord direction H-KT of the main wing. The expression "protrude" means a protruding in the direction running opposite direction than the main-wing thickness direction H-KD. The fairing in particular covers the components of the guiding device and/or the adjusting device with regard to or against the air flow, this means when seen in the main-wing chord direction H-KT.

Within this fairing 118 the flow influencing device 10 is situated. In this arrangement the inlet line 20 of the flow influencing device 10 extends within this fairing 118. After an upwards kink the inlet line 20 leaves the fairing 118 and extends to the trailing-edge flap 116. Within the contour of the trailing-edge flap 116 a Y-switch is provided that connects the inlet line 20 to a distributor line 40. The outlet line 30 follows on from the distributor line 40.

Both the inlet line 20 and the outlet line 30 include an opening, namely the inlet 22 and the outlet 32. In this arrangement the outlet 32 is arranged at the top of the trailing-edge flap 116 so that air flowing through the flow influencing device 10 can be delivered at the top of the trailing-edge flap 16. At this point of the trailing-edge flap 16 the flow at the top of the high-lift system 100 tends to separate. As a result of the additional support of the flow by means of the flow influencing device 10 by way of the outlet 32, separation of the flow at the trailing-edge flap 16 can be prevented or at least delayed, or reattachment of the flow in this region may even be achieved.

In FIG. 1 the inlet 22 of the inlet line 20 of the flow influencing device 10 is provided on the side of the fairing 118, which side faces the direction of flow. Thus, while the inlet line is situated at an inclination to the direction of flow, it does, however, include an effective cross section against the direction of flow and thus faces the chord direction of the main wing. This means that the inlet 22 projects against the direction of flow and is thus in a position to scoop air from the flow at the bottom 104 of the high-lift system 100 and to convey it into the inlet line 20.

In this arrangement both the inlet 22 and the outlet 32 include closing devices 24 and 34. In this example embodiment both the inlet opening and closing device 24 and the outlet opening and closing device 34 are designed as mechanical flaps that can open and close the inlet 22 or the outlet 32. In this example embodiment according to FIG. 1 the opening direction of the respective closing device 24 and 34 is aligned in the direction of flow. This means that overpressure that arises at the overpressure side of the closing device 24 and 34, namely at the outside of the fairing 118 as well as at the inside of the outlet opening and closing device 34, causes the respective closing device 24 and 34 to open. However, in this arrangement both closing devices 24 and 34 are actively controllable in order to hold the respective closing device 24 and 34 in a closed or open state irrespective of the flow situation at the respective closing device.

The use of mechanical opening flaps, as shown in FIG. 1, on the closing devices 24 and 34 is associated with a further advantage in that in this manner quantitative inlet control can take place. Thus, by way of the defined opening position of the inlet opening and closing device 24 the flow-effective cross section of the inlet 22 can be increased or reduced in order to control in this manner the quantity of air let in.

In the example embodiment of FIG. 1 there is, furthermore, a pump 70 arranged in the inlet line 20, which pump 70 can provide the overpressure, which is necessary for influencing the flow, in the flow influencing device 10 even in slow flight situations. In a slow flight situation the pump 70 is in a position to generate at its suction side negative pressure that sucks a quantity of air into the inlet line 20, which quantity exceeds that which would flow through the inlet 22 purely as a result of the flight speed. On the pressure side of the pump 70 this increased quantity of air is pushed in the direction of the distributor line 40 and the outlet line 30.

In the inlet line 20, furthermore, a switch is provided, wherein a switch arm as a free switch arm leads to the distributor line 40, while a second switch arm is used to receive a flow variator 50 and subsequently also leads to the distributor line 40. Of course, within the context of the present invention it is also imaginable to arrange the flow variator 50 and the switch downstream of the distributor line 40. As a result of the free switch arm, a defined quantity of air, namely defined by way of the flow cross section of the free switch arm, can constantly flow into the distributor line and by way of the outlet line 30 and the outlet 32 onto the top of the trailing-edge flap 116. This base flow is overlaid by the flow variator 50, which in a pulsating manner lets an additional quantity of air into the distributor line 40 and the outlet line 30, so that a pulsating flow between a minimum airflow and a maximum airflow exits from the outlet 32.

Furthermore, the coupling 140 is shown as a line, which coupling 140 uses the position of the adjustment device 120 to control the inlet opening and closing device 24.

Figure 2:
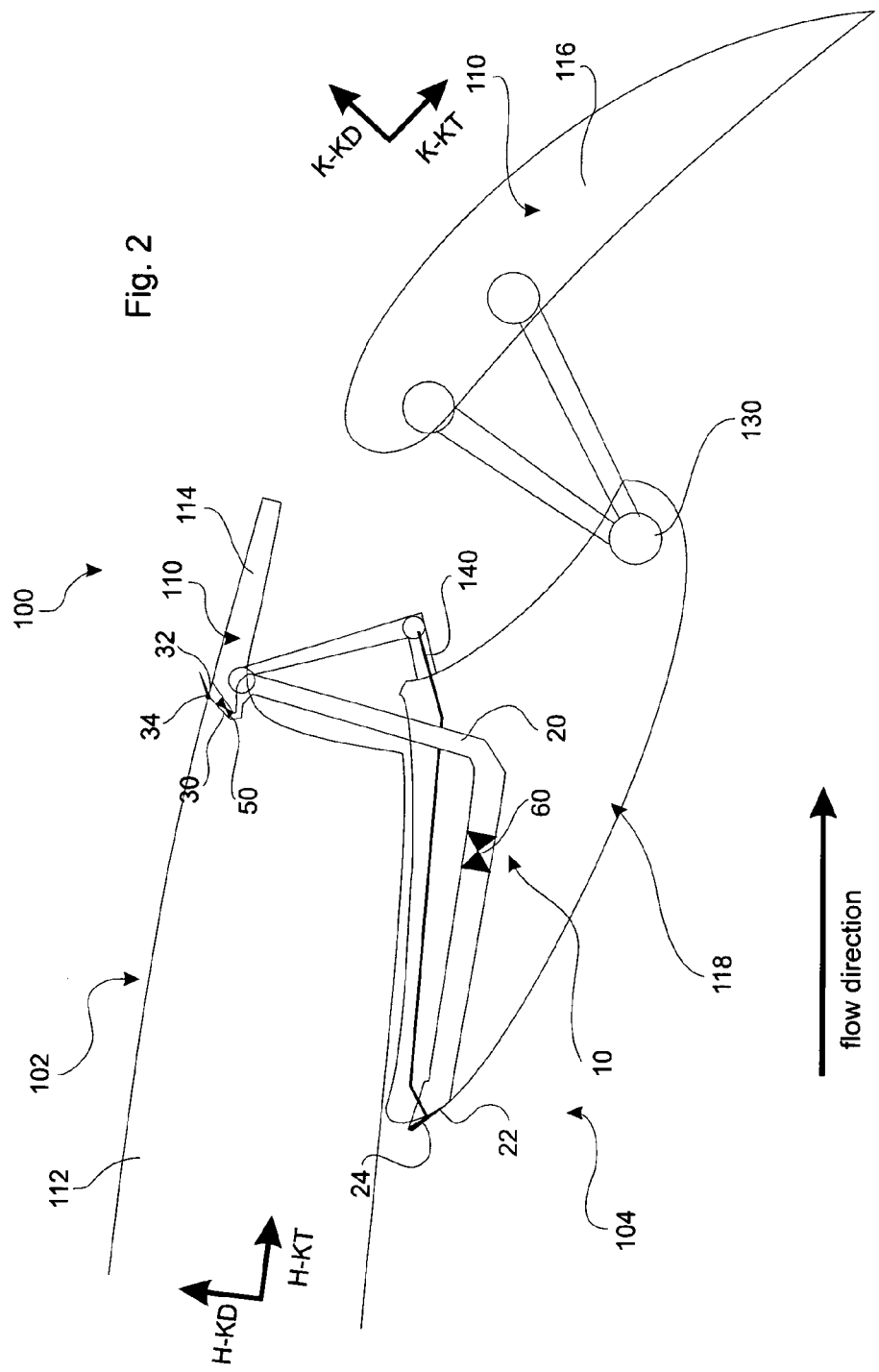
FIG. 2 a second example embodiment of the present invention.

FIG. 2 shows a further example embodiment of a high-lift system 100. In a manner that differs from that of the example embodiment according to FIG. 1, in FIG. 2 the flow influencing device 10 is not provided for the trailing-edge flap 116 but instead for the adjustable flap 110 on the main wing 112, namely the spoiler 114. In this arrangement the inlet line 20 of the flow influencing device 10 is again arranged within the fairing 118 and leaves the aforesaid in an upwards direction towards the main wing 112 at the region of said main wing 112 near the spoiler 114. At that point the inlet line 20 enters the fairing of the main wing 112 and of the spoiler 114 and leads into the outlet line 30. In the outlet line 30 a flow variator 50 is arranged that releases a pulsating airflow into the outlet line 30, thus making it possible to provide a pulsating influence on the spoiler 114 by way of the outlet 32.

Both the inlet 22 and the outlet 32 of the flow influencing device 10 again include closing devices 24 and 34. In FIG. 2 the inlet opening and closing device 24 is now shown in its closed state. In this situation the flow influencing device is thus fluidically inactive, and thus not effective. Instead, the flow at the bottom 104 of the high-lift system 100 is not influenced and slides off at the fairing 118.

In the interior of the inlet line 20 a control valve 60 for throttling the airflow in the flow influencing device is provided. In this way it is possible, with the inlet opening and closing device 24 fully open, to further vary the quantity of air within the inlet line 22. In those cases where, for example in cruising situations or fast flight manoeuvres, a large quantity of air reaches the inlet line 20 by way of the inlet 22, which quantity of air is, however, excessive for bringing about the desired influencing of the control system, this quantity can be throttled by way of the control valve 60. Thus only a defined quantity of air reaches the flow variator 50 over the remaining distance of the inlet line 20, which flow variator 50 can perform its flow-influencing variation task by generating a defined and pulsed flow by way of the outlet 32 at the top of the spoiler 114. Furthermore, the coupling 140 is shown as a line, which coupling 140 uses the position of the adjustment device 120 in order to control the inlet opening and closing device 24.

Figure 3:
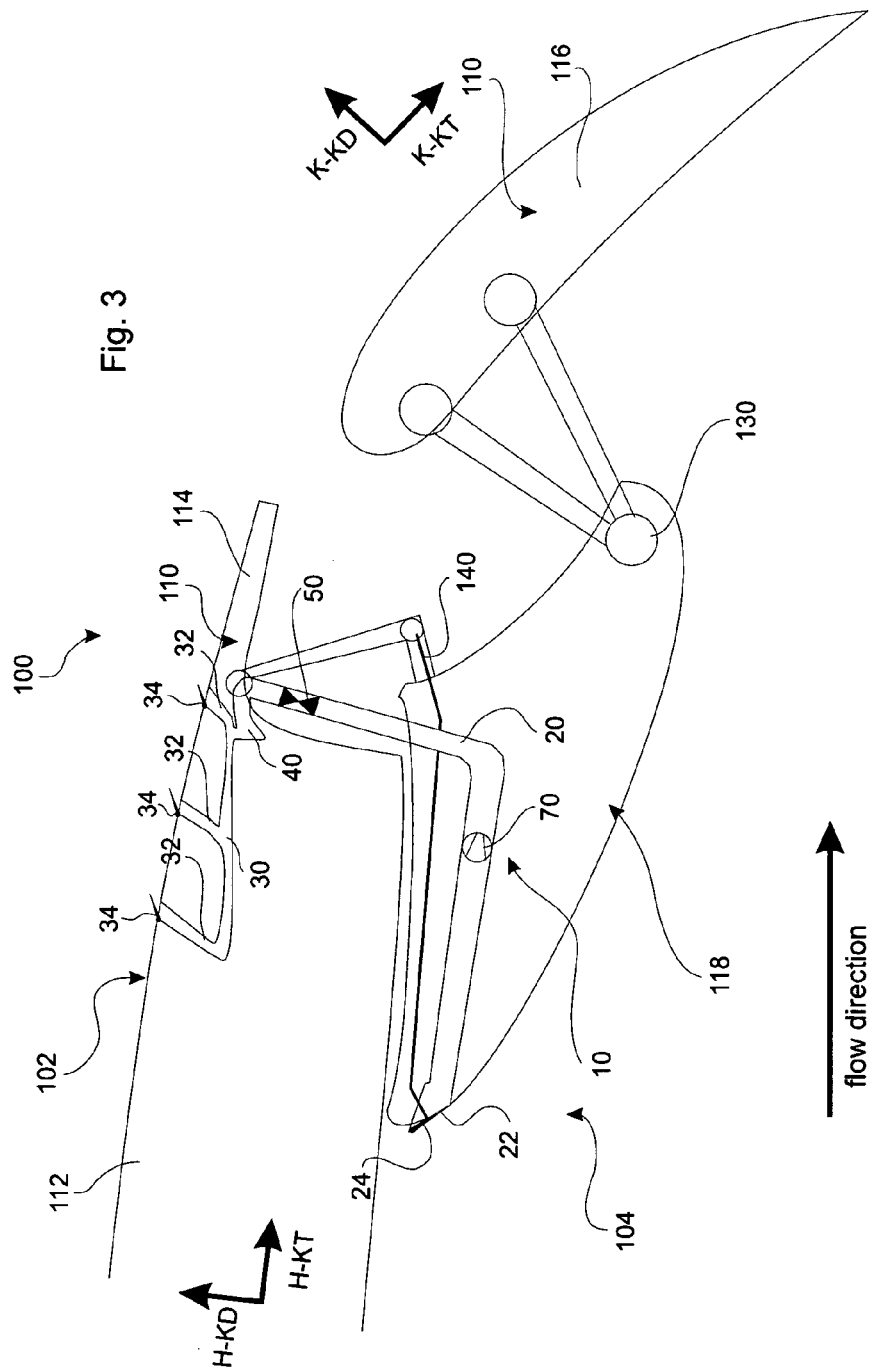
FIG. 3 a third example embodiment of the present invention.

FIG. 3 shows a modification of the example embodiment according to FIG. 2. In this example embodiment the outlets 32 are not only provided on the spoiler 114 but also on the main wing 112. In this arrangement two outlets 32 are provided at the top of the main wing 112, and one at the top of the spoiler 114. The two outlets 32 at the top of the main wing 112 are thus situated in the region of the spoiler 114 or in general an adjustable flap and in particular in a region extending in the spanwise direction adjacent the flap. In this manner still more effective flow influencing by means of a flow influencing device 10 is possible. In this manner, the flow at the top 102 of the high-lift system 100 is influenced at several positions and can thus in the region of the spoiler 114 already be fully influenced, and can thus fully develop the effect to be achieved by the influencing action. An airflow that has already separated upstream of the spoiler 114 can in this manner be reattached, at least in part, thus reaching the spoiler 114 in the reattached state. In this manner the spoiler 114 can make full use of its aerodynamic effect.

In the example embodiment according to FIG. 3 the flow variator 50 is provided in the inlet line 20. In this arrangement the flow variator 50 is situated upstream of the distributor line 40 and thus also upstream of the outlet lines 30. In this manner a single flow variator 50 can be used for a multitude of outlet lines 30 and outlets 32. This results in a considerable reduction in weight being achieved. Furthermore, the costs relating to the flow variator 50 are incurred only once for a multitude of outlet lines 30 and outlets 32.

Furthermore, in the example embodiment according to FIG. 3 a pump 70 is again provided in the inlet line 20, which pump 70, for example in slow flight situations, can generate negative suction pressure in the region of the inlet 22 in order to ensure an adequate quantity of air to supply the flow at the top 102 of the high-lift system 100 even is such flight situations. Furthermore, the coupling 140 is shown as a line, which coupling 140 uses the position of the adjustment device 120 to control the inlet opening and closing device 24.

Figure 4:
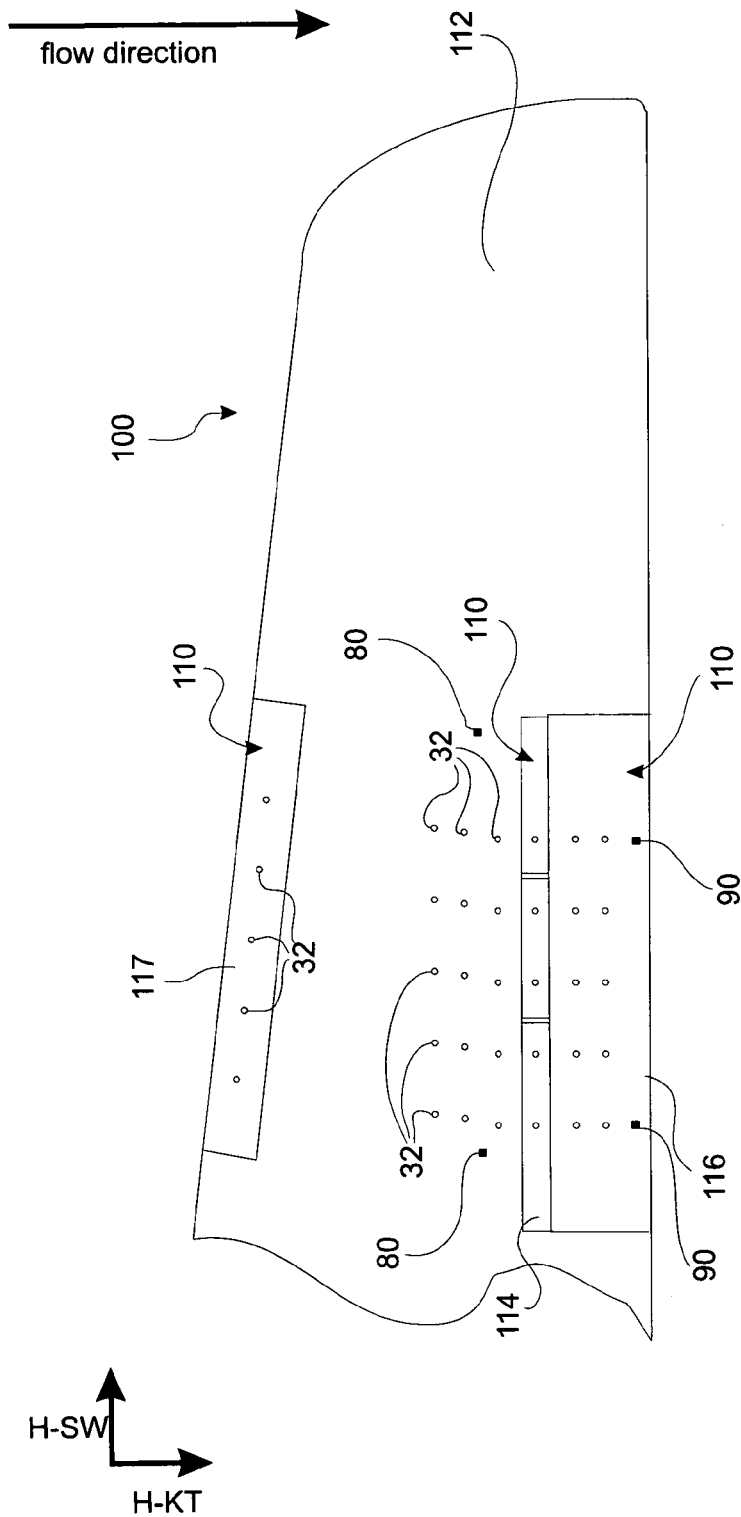
FIG. 4 a top view of a high-lift system according to an embodiment of the invention, FIG. 5a a lateral view of a further embodiment of a high-lift system according to the invention, FIG. 5b the lateral view of FIG. 5a with the inlet opening and closing device open, FIG. 6 a diagrammatic view of a flow influencing device.

FIG. 4 shows a top view of a high-lift system 100. This top view shows several options of arranging outlets 32. In this arrangement, outlets 32 are provided on all the adjustable flaps 110 and on the main wing 112 itself. At the leading edge of the main wing 112 a leading-edge flap 117 with outlets 32 of a flow influencing device 10 is provided. At the trailing edge of the main wing 112 a trailing-edge flap 116 is provided, which also includes outlets 32 for influencing the flow at the top 102 of the high-lift system 100. Outlets 32 are also provided on a spoiler 114. Likewise, in the region upstream of the spoiler, this means in a direction being directed opposite to the chord direction, outlets 32 are provided on the main wing 112 itself. In the embodiment shown in FIG. 4 three spoilers are hinged to the main wing. Said outlets 32 influence the flow at the top 102 already before said flow reaches the spoiler 114 and the trailing-edge flap 116. It is thus possible to have the flow influenced already when it reaches the respective adjustable flap 110 so that preventing or delaying separation of the flow, or even reattachment of the flow, can be achieved in a still more efficient manner. In this arrangement in an example embodiment according to FIG. 4 both a separate flow influencing device 10 for each adjustable flap 110, and shared flow influencing devices 10 for two or for several adjustable flaps 110 can be provided.

Figure 5A:
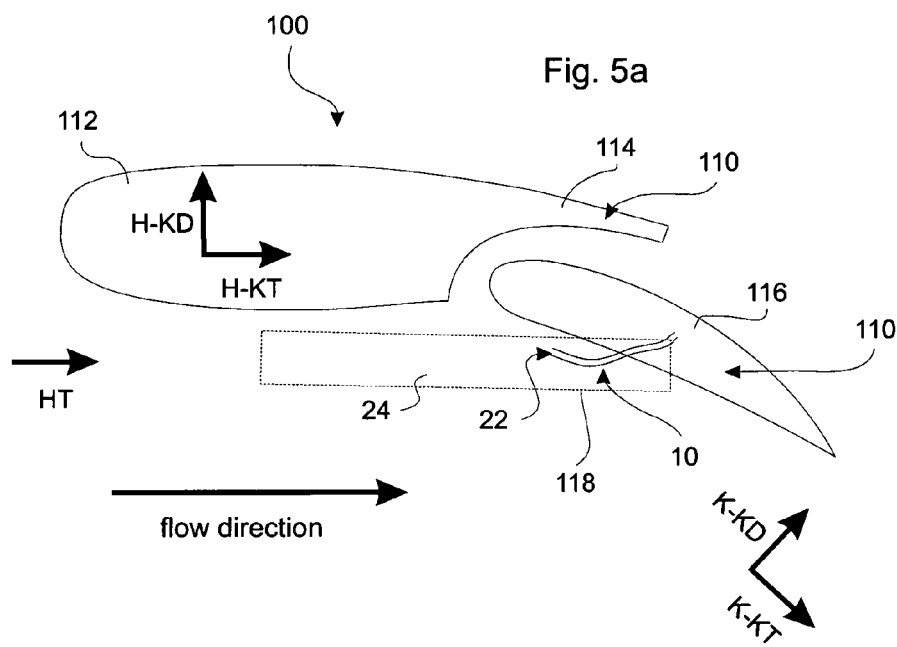
Figure 5B:
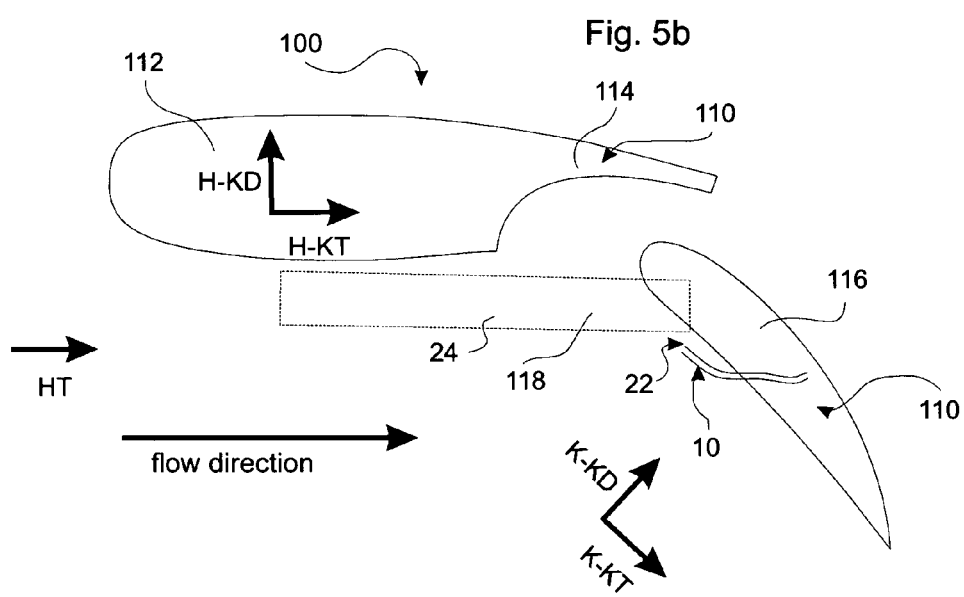

The two FIGS. 5a and 5b show two situations of a further embodiment of the present invention. In the high-lift system 100 shown in the diagram the adjustable flap 110, in the present embodiment the trailing-edge flap 116, includes a flow influencing device 10 (not shown in detail). This flow influencing device 10 includes an inlet 22 for the inlet line 20, wherein the inlet 22 as an inlet opening and closing device 224 uses part of the fairing 118. Accordingly there exists spatial separation between the inlet 22 and the inlet opening and closing device 24. In the context of this embodiment of the high-lift system 100 it should further be noted that opening and closing the inlet opening and closing device takes place by way of moving the inlet 22 rather than by way of moving the inlet opening and closing device 24. In other words, a kinematic reversal quasi exists.

For further explanation, in the following the function of the embodiment shown in FIGS. 5a and 5b is described briefly. FIG. 5a shows the trailing-edge flap 116 in a position in which the inlet 22 of the flow influencing device 10 is covered by the fairing 118, which in the present embodiment acts as an inlet opening and closing device, and is thus closed. If the trailing-edge flap 116 is then moved, in the flap chord direction K-KT, further away from the trailing edge of the main wing 112, the flow influencing device 10 moves along, together with the trailing-edge flap 116. In this manner the flow influencing device 10, and thus also the inlet 22, leave the fairing 118 which in this embodiment acts as an inlet opening and closing device. Finally, the trailing-edge flap 116 reaches the position shown in FIG. 5b, in which position the inlet 22 is completely clear of the fairing 118, and thus air can be conveyed from the lower flow of the high-lift system 100 into the flow influencing device 10.

Figure 6:
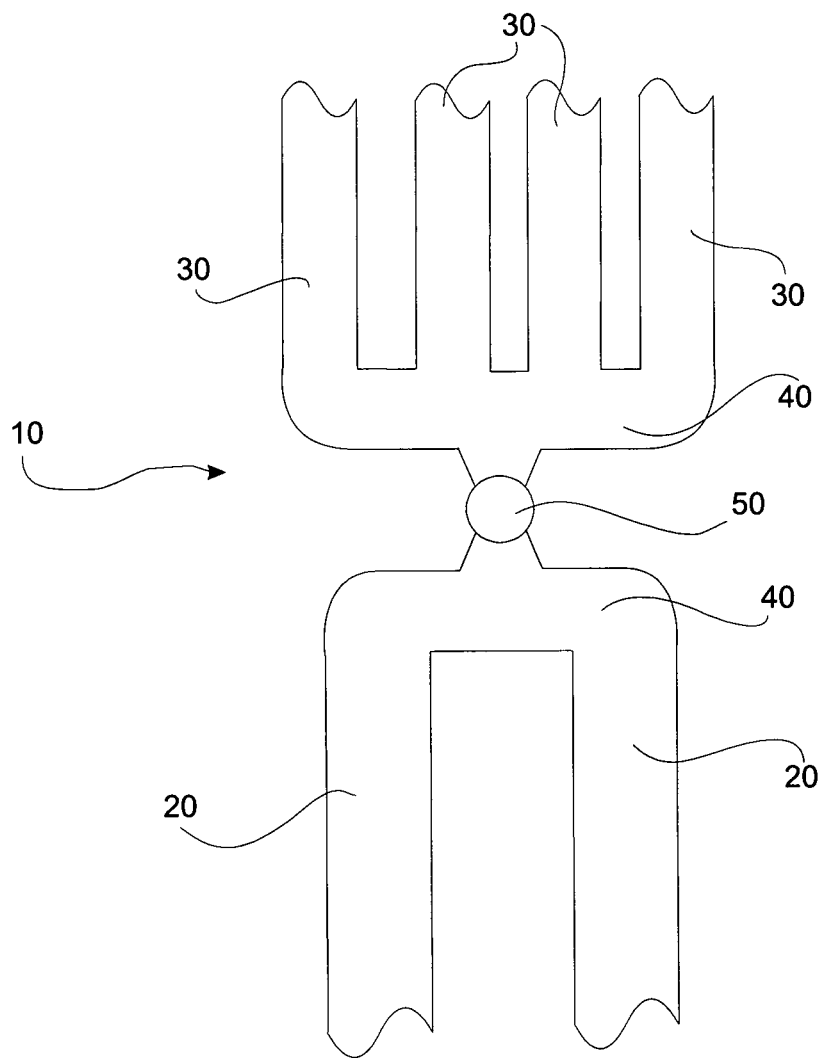

FIG. 6 shows an example embodiment of a flow influencing device, wherein a clearly more efficient design has been selected. Two symmetrical inlet lines 20 are provided which merge in a first distributor line 40. From the point of view of the fluidic direction adjacent there is a central shared flow variator 50 which can vary, in particular pulsate, the flow from the inlet lines 20. Following on, a further distributor line 40 is provided, by way of which the varied, in particular the pulsed, flow is distributed to three or even more outlet lines 30. This example embodiment includes a multitude of advantages. Thus, by way of the symmetric arrangement with large cross section of two inlet lines 20 a defined quantity of air can be brought into the system. Furthermore, by providing a first and a second distributor line 14 a single flow variator 50 is adequate. This provides savings not only in relation to the overall weight of the system, but moreover also in relation to its complexity. Thus in this embodiment only a single flow variator 50 needs to be controlled and regulated. In this example embodiment according to FIG. 6 a total of four, but in other example embodiments such as in that of FIG. 4 a significantly greater number, i.e. a multitude, of outlet lines 30, can be served by way of the second distributor line 40, so that the multitude of outlets 32 shown in FIG. 4 can be served by a relatively small number of inlet lines 20. In summary, with a high-lift system 100 according to various embodiments of the invention, the inlets 22 with the corresponding inlet lines 20 can be constructed taking into account the requirements relating to aerodynamics and the required quantity of air, while the outlet lines 30 and the corresponding outlets 32 are distributed at the top or suction side surface 102 of the high-lift system 100 depending on the situations of flow separation. With the incorporation of distributor lines 40 and with multiple use it is possible to minimise the use of complex, heavy and expensive elements such as, for example, the flow variator 50, pumps 70 or control valves 60.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

List of Reference Characters

10 Flow influencing device
20 Inlet line
22 Inlet
24 Inlet opening and closing device
30 Outlet line
32 Outlet
34 Outlet opening and closing device
40 Distributor line
50 Flow variator
60 Control valve
70 Pump
80 Load sensor
90 Flow sensor
100 High-lift system
102 Top of the high-lift system
104 Bottom of the high-lift system
110 Adjustable flap of the high-lift system
112 Main wing
114 Spoiler
116 Trailing-edge flap
117 Leading-edge flap
118 Fairing
120 Adjustment device
130 Guiding device
140 Coupling
H-KT Main wing, chord direction
H-1(D Main wing, thickness direction
H-SW Main wing, wingspan direction
K-KT Adjustable flaps, chord direction
K-KT Adjustable flaps, thickness direction

What is claimed is:

1. A high-lift system with a main wing and adjustable flaps as well as guiding devices for guiding the adjustable flaps and adjustment devices for adjusting the adjustable flaps, wherein the respective guiding devices or adjustment devices at least in part comprise a fairing, the high-lift system comprising:
  a flow influencing device for influencing the flow around the high-lift system, the flow influencing device comprising:
    at least one inlet line with at least one inlet that is situated on a pressure side of the high-lift system, wherein the inlet line is a hose structure or a telescopic line that includes telescoping elements,
    at least one outlet line for air, which is connected to the inlet line by a fluid-communicating connection and which comprises at least one outlet situated at a suction side of the high-lift system in a region of at least one adjustable flap, wherein the outlet line comprises a hose structure or a telescopic line that includes telescoping elements, and
    in relation to the inlet, an inlet opening and closing device which is coupled to the adjustment devices in such a manner that by adjusting at least one adjustable flap by a coupling, the inlet opening and closing device is opened or closed.

2. The high-lift system according to claim 1, wherein the coupling comprises a mechanical coupling between the inlet opening and closing device and the adjustment device.

3. The high-lift system according to claim 1, wherein the coupling comprises an electronically controlled coupling between the inlet opening and closing device and the adjustment device.

4. The high-lift system according to claim 1, wherein the inlet opening and closing device can assume quantitatively different opened positions, which opened positions cause different flow throughputs through the flow influencing device.

5. The high-lift system according to claim 1, wherein sensors are provided that detect the state of the inlet opening and closing device at the inlet.

6. The high-lift system according to claim 1, wherein the flow influencing device is arranged at least in part within the fairing, and the at least one inlet faces the chord direction of the main wing of the high-lift system.

7. The high-lift system according to claim 1, wherein one outlet opening and closing device is provided for the at least one outlet.

8. The high-lift system according to claim 1, wherein in the at least one inlet line or the at least one outlet line a control valve or a pump for influencing the volume flow is provided within the flow influencing device.

9. The high-lift system according to claim 1, wherein a flow variator for the targeted variation of the airflow of the flow influencing device is provided.

10. The high-lift system according to claim 8, wherein the flow variator is designed as a passively operating valve or as a pump.

11. The high-lift system according to claim 8, wherein the flow variator is arranged in the region of the at least one outlet or the outlet line.

12. The high-lift system according to claim 1, wherein the high-lift system comprises a control device comprising a function for generating control signals on the basis of acquired flight state data, wherein the flow influencing device can be regulated by the control device in certain flight situations.

13. The high-lift system according to claim 1, wherein a distributor line is provided between the at least one inlet line and the at least one outlet line.

14. The high-lift system according to claim 1, wherein at least one inlet line can be brought into fluid-communicating contact with further systems of an aircraft.

15. A flow influencing device according to claim 1, wherein the lines have axial characteristics, wherein the axial characteristics of the lines are at least in part variable.

16. An aircraft comprising at least one high-lift system of claim 1.

* * * * *